US011868553B2

(12) United States Patent
Calderon et al.

(10) Patent No.: US 11,868,553 B2
(45) Date of Patent: Jan. 9, 2024

(54) PRESSURE SENSING FOR USER INTERACTIONS

(71) Applicant: Meta Platforms Technologies, LLC, Menlo Park, CA (US)

(72) Inventors: Ramiro Calderon, New York, NY (US); Edwin Corona Aparicio, Houston, TX (US); Szymon Michal Tankiewicz, San Jose, CA (US); Nishant Srinivasan, San Francisco, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 18/062,304

(22) Filed: Dec. 6, 2022

(65) Prior Publication Data

US 2023/0289007 A1    Sep. 14, 2023

Related U.S. Application Data

(60) Provisional application No. 63/319,204, filed on Mar. 11, 2022.

(51) Int. Cl.
*G06F 3/041* (2006.01)
*G06F 3/01* (2006.01)
(Continued)

(52) U.S. Cl.
CPC ............ *G06F 3/0414* (2013.01); *G06F 3/016* (2013.01); *G06F 3/02* (2013.01); *H04N 23/62* (2023.01); *G04G 21/08* (2013.01)

(58) Field of Classification Search
CPC .... G06F 3/04142; G06F 3/0414; G06F 3/016; G06F 3/02; G06F 3/014; G06F 3/00;
(Continued)

(56) References Cited

U.S. PATENT DOCUMENTS

2006/0170649 A1\* 8/2006 Kosugi ................ G06F 1/1686
348/E5.026
2014/0062892 A1   3/2014 Dickinson et al.
(Continued)

OTHER PUBLICATIONS

Invitation to Pay Additional Fees for International Application No. PCT/US2023/014784, dated Jun. 21, 2023, 9 pages.
(Continued)

*Primary Examiner* — Temesghen Ghebretinsae
*Assistant Examiner* — Ivelisse Martinez Quiles
(74) *Attorney, Agent, or Firm* — Weaver Austin Villeneuve & Sampson LLP

(57) ABSTRACT

Methods, systems, apparatuses, and media for pressure sensing for user interactions are disclosed herein. In some implementations, a method involves obtaining sensor data from one or more sensors disposed proximate to an enclosure of a capsule of a wrist-worn device. In some implementations, the method involves determining, based on the sensor data, that a press interaction has occurred. In some implementations, the method involves determining, based on the sensor data, force characteristics associated with the press interaction. In some implementations, the method involves identifying a press type of a plurality of press types based on the force characteristics. In some implementations, the method involves identifying an operations of the wrist-worn device from a plurality of operations based on the press type. In some implementations, the method involves causing the identified operation to be performed by the wrist-worn device.

9 Claims, 7 Drawing Sheets

(51) Int. Cl.
*G06F 3/02* (2006.01)
*G04G 21/08* (2010.01)
*H04N 23/62* (2023.01)

(58) Field of Classification Search
CPC ........ G06F 3/011; H04N 23/62; G04G 21/08; A61B 5/681; A61B 5/6843; G01L 5/22; G01L 5/228
See application file for complete search history.

(56) References Cited

U.S. PATENT DOCUMENTS

| | | | |
|---|---|---|---|
| 2015/0277559 A1 | 10/2015 | Vescovi et al. | |
| 2017/0357362 A1* | 12/2017 | Shim | G06F 3/0488 |
| 2020/0033815 A1 | 1/2020 | Bushnell et al. | |
| 2020/0097086 A1* | 3/2020 | Bushnell | H10N 30/20 |
| 2020/0233495 A1 | 7/2020 | Bushnell et al. | |
| 2020/0244262 A1 | 7/2020 | Bushnell et al. | |
| 2020/0319768 A1* | 10/2020 | Drake | G04G 9/007 |
| 2022/0050425 A1* | 2/2022 | Connor | G04G 21/02 |
| 2022/0350419 A1* | 11/2022 | Shin | A61B 5/282 |
| 2023/0005354 A1* | 1/2023 | Schlagenhauf | G01L 5/228 |

OTHER PUBLICATIONS

Potuck M., "How to charge Apple Watch and check battery life—9to5Mac," Nov. 9, 2018, Retrieved from Internet: https://9to5mac.com/2018/11/09/how-to-charge-apple-watch-check-battery-life/, [retrieved on Jul. 3, 2023], 7 pages.

International Search Report and Written Opinion for International Application No. PCT/US2023/014784, dated Aug. 11, 2023, 15 pages.

* cited by examiner

PRESSURE SENSING FOR USER INTERACTIONS

RELATED APPLICATIONS

This application claims the benefit of U.S. Provisional Application No. 63/319,204, filed on Mar. 11, 2022, which is assigned to the assignee hereof, and incorporated herein in its entirety by reference.

BACKGROUND

Wrist-worn devices, such as smart watches, fitness trackers, etc. are becoming increasingly common. A user may frequently interact with a wrist-worn device, for example, to initiate certain operations of the device, to cause a particular screen or user interface to be displayed, etc. User interaction may frequently occur using a physical button. However, physical buttons can have disadvantages, such as a larger form factor. Moreover, a physical button is typically limited to binary inputs, e.g., whether the button is pressed or not. Accordingly, a physical button may physically take up space on a device while being limited in what user interactions can be triggered or captured.

SUMMARY

Methods, systems, and media for pressure sensing for press interactions are provided.

In some embodiments, a method for utilizing contact pressure measurements of wrist-worn devices comprises: obtaining sensor data from one or more sensors disposed proximate to an enclosure of a capsule of the wrist-worn device; determining, based on the sensor data, that a press interaction has occurred; determining, based on the sensor data, force characteristics associated with the press interaction; identifying a press type of a plurality of press types based on the force characteristics; identifying an operations of the wrist-worn device from a plurality of operations based on the press type; and causing the identified operation to be performed by the wrist-worn device.

In some examples, the force characteristics comprise a magnitude of a force of the press interaction and a duration of the press interaction. In some examples, the press type of the plurality of press types is identified based on a combination of the magnitude of the force of the press interaction and the duration of the press interaction. In some examples, the press type of the plurality of press types is identified based on a change in the force of the press interaction over the duration of the press interaction.

In some examples, a first press type of the plurality of press types is associated with a first operation of wrist-worn device, and wherein a second press type of the plurality of press types is associated with a second operation of the wrist-worn device. In some examples, the plurality of operations comprise: one or more operations associated with a camera of the wrist-worn device, causing a home display to be presented, selecting a menu element displayed on a display of the wrist-worn device, detaching the capsule from a cradle of the wrist-worn device, or any combination thereof. In some examples, the one or more operations associated with the camera of the wrist-worn device comprise: capturing camera data from a front camera of the wrist-worn device, capturing camera data from a rear camera of the wrist-worn device, performing an auto-focus operation of the front camera or the rear camera, or any combination thereof.

In some examples, the one or more sensors are associated with a button element of the capsule of the wrist-worn device.

In some examples, the one or more sensors comprise two or more sensors, and further comprising determining a location of the press interaction along the capsule based on the sensor data. In some examples, the method further comprises determining a parameter of the identified operation based on the determined location of the press interaction, wherein causing the identified operation to be performed comprises utilizing the determined parameter.

In some examples, identifying the operation is based at least in part on whether the capsule is attached to a cradle of the wrist-worn device.

According to some embodiments, a wrist-worn device comprises: a capsule, comprising a top portion, a bottom portion, and a side portion joining the top portion and the bottom portion, wherein the side portion comprises an external side and an internal side; a sensor, the sensor having a first side and a second side, the first side coupled to a circuit board, wherein the circuit board is affixed to a portion of the internal side of the side portion of the capsule via a thermally isolating material, the sensor configured to generate sensor data indicative of a force applied to a corresponding portion of the external side of the side portion of the capsule; and a linear resonator actuator (LRA) configured to provide haptic feedback to a wearer of the wrist-worn device, the LRA affixed to the second side of the sensor.

In some examples, the sensor is configured to detect a compression force resulting from the force applied to the corresponding portion of the external side of the side portion of the capsule.

In some examples, the thermally isolating material comprises rubber, foam, or a silicon-containing material.

In some examples, the wrist-worn device further comprises a bracket affixed to the circuit board and the internal side of the side portion of the capsule.

In some examples, the wrist-worn device further comprises a controller configured to cause at least one operation to be performed based on data obtained from the sensor. In some examples, the controller is configured to identify a press type of a plurality of press types based on force characteristics associated with the sensor data. In some examples, the force characteristics comprise a magnitude of a force of a press associated with the force characteristics and a duration of the press associated with the force characteristics. In some examples, the at least one operation comprises: one or more operations associated with a camera of the wrist-worn device, causing a home display to be presented, selecting a menu element displayed on a display of the wrist-worn device, detaching the capsule from a cradle of the wrist-worn device, or any combination thereof. In some examples, the one or more operations associated with the camera of the wrist-worn device comprise: capturing camera data from a front camera of the wrist-worn device, capturing camera data from a rear camera of the wrist-worn device, performing an auto-focus operation of the front camera or the rear camera, or any combination thereof.

BRIEF DESCRIPTION OF THE DRAWINGS

Illustrative embodiments are described in detail below with reference to the following figures.

Figure 1:
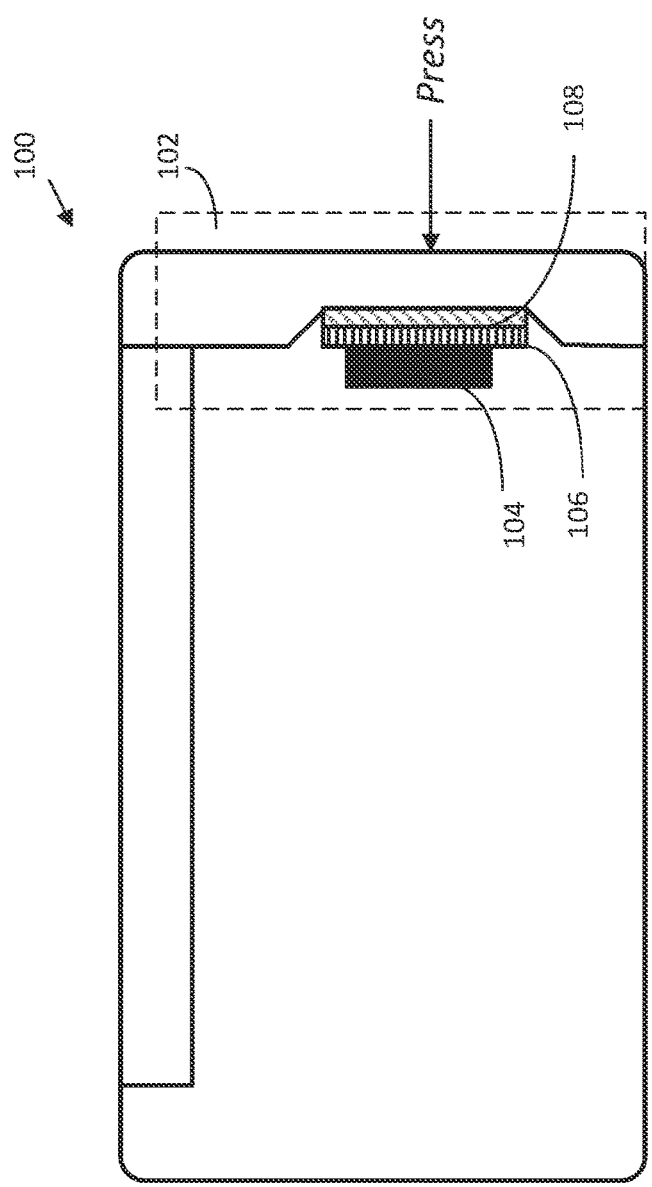
FIG. 1 is a cross-sectional side view of an example wrist-worn device that includes a pressure sensor suitable for use in connection with user interactions according to certain embodiments.

The figures depict embodiments of the present disclosure for purposes of illustration only. One skilled in the art will readily recognize from the following description that alternative embodiments of the structures and methods illustrated may be employed without departing from the principles, or benefits touted, of this disclosure.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Conventional wrist-worn devices typically use physical buttons, for example, on a side portion of an enclosure or a top portion of an enclosure, to receive user input. For example, such a button may be used to initiate or trigger various operations, such as pulling up a menu of options, selecting a particular option from a menu or list, muting volume of audio content on a paired device (e.g., a paired mobile phone), etc. In conventional technology, such a physical button includes a button cap on an external portion of the enclosure, which is connected in an internal portion of the capsule to a piston. The piston may then travel to depress a tactile dome that is disposed in the internal portion of the capsule. Collapse of the dome may trigger detection of the button press, which may cause a corresponding action or operation to be initiated. However, such physical button mechanisms have drawbacks. For example, physical button mechanisms may have increased form factor, making the device bulkier than desired. As another example, it may be difficult to properly water seal a device that includes a physical button mechanism due to the moving components. Moreover, physical button mechanisms operate in a binary manner in which the button is either pushed or not. Accordingly, such a physical button mechanism is limited in the number of user interactions the physical button mechanism can trigger or initiate.

Disclosed herein are systems, methods, apparatuses, and media for utilizing contact force or pressure measurements of wrist-worn devices for use in connection with user interactions. In particular, a wrist-worn device, as described herein, may include one or more sensors (e.g., force sensors) disposed proximate to an enclosure of a capsule of the wrist-worn device. For example, the one or more sensors may be disposed proximate to an inner wall of the enclosure such that a press on the outer wall of the enclosure causes at least one of the one or more sensors to register changes in detected force responsive to the press. In some implementations, based on sensor data captured by the one or more sensors, a determination that a press interaction has occurred may be made (e.g., that a wearer of the wrist-worn device has pressed on a portion of the enclosure). In some embodiments, force characteristics associated with the press interaction may be determined. The force characteristics may include a magnitude of the force (e.g., in Newtons), a pressure associated with the force (e.g., determined based on an area over which the force is applied), a duration during which the force was applied (e.g., in milliseconds, seconds, etc.), a manner in which the magnitude of the force changed over time (e.g., as a monotonic ramp that increased in magnitude or decreased in magnitude, as a step-wise change in force magnitude, etc.), or the like. In other words, the force characteristics may include continuous-valued data (rather than binary-valued data) associated with one or more dimensions (e.g., force magnitude, press duration, change in force magnitude over time, etc.). In some embodiments, a press type may be identified or selected from a set of candidate press types based at least in part on the force characteristics. Example press types include "short tap," "short hard press," "long hard press," "ramp up," "press halfway," "full press," and the like. In other words, the continuous-valued data associated with the force characteristics may be mapped to a particular press type of a set of candidate press types (e.g., rather than a binary determination of whether or not a press occurred).

In some implementations, the set of candidate press types may include pre-defined press types. For example, a particular pre-defined press type may be associated with various force characteristic criteria, such as that the force magnitude is to be within a predetermined range, that a press duration is to be within a predetermined range, that a change in force magnitude is to be in a particular direction (e.g., increasing or decreasing), that a change in force magnitude is to have a substantially constant first derivative (e.g., in the case of a ramp), that a change in force magnitude is to be a step-wise jump, and/or any suitable combination of criteria. It should be noted that in instances in which the criteria include thresholds (e.g., force magnitude thresholds and/or press duration thresholds), such thresholds may be hard-coded or user-specified. In some implementations, thresholds may be set on an individualized basis using a calibration process that characterizes force magnitudes generated by a particular wearer of a wrist-worn device.

Figure 2:
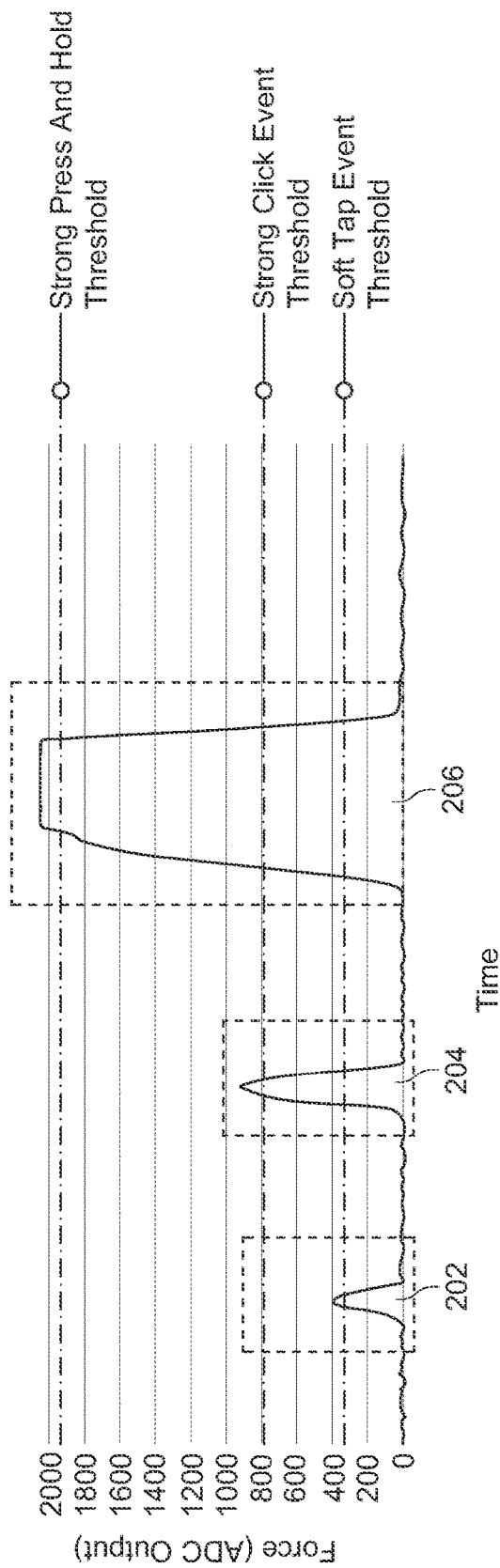
FIGS. 2 and 3 are graphs that illustrate example force characteristics associated with various press types according to some embodiments.
Figure 3:
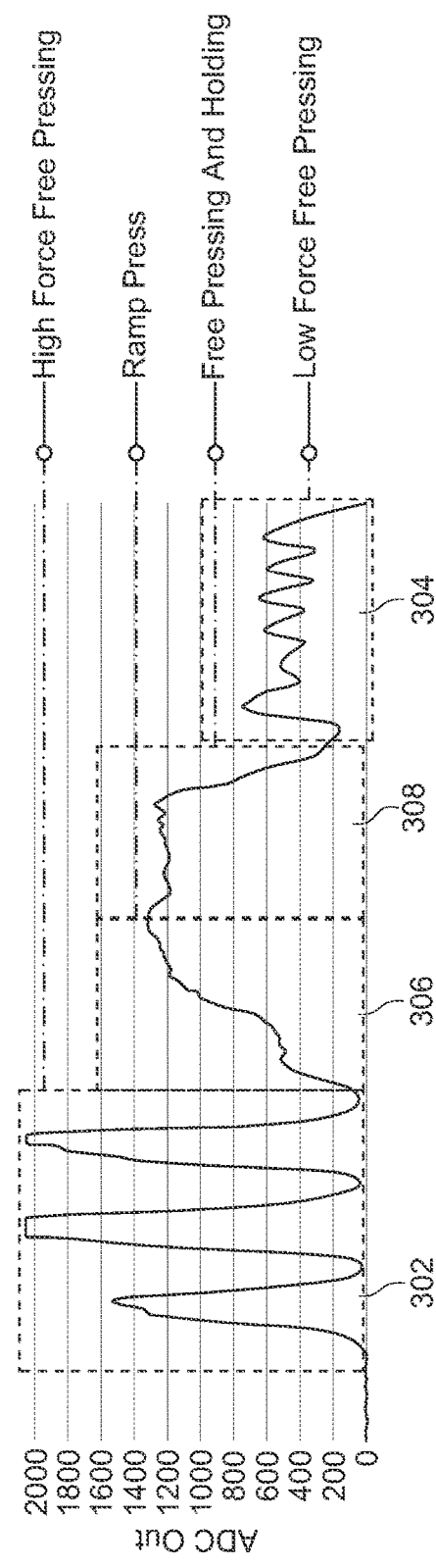

Based at least in part on the identified or selected press type, an operation of the wrist-worn device may be identified from a set of operations. Example operations include an operation associated with a camera of the wrist-worn device, causing a home display to be presented, causing a particular menu element to be selected, detaching the capsule of the wrist-worn device from a cradle, causing the wrist-worn device to enter a waterproofing mode, etc. In some implementations, a component or set of related components of the wrist-worn device may be associated with multiple operations, where a particular operation may be identified based on the identified press type. By way of example, operations associated with one or more cameras of the wrist-worn device include capturing image data from a front camera, capturing image data from a rear camera, performing an auto-focusing operation, capturing video data rather than still image data, or the like. Continuing with this example, performing an auto-focusing operation may be associated with a first press type of the plurality of press types, and capturing camera data using a particular camera (e.g., a front camera or a rear camera) may be associated with a second press type of the plurality of press types. By way of example, performing an auto-focus operation may be triggered by a press type corresponding to a half press (e.g., a having a force magnitude within a predetermined range that spans a roughly half-maximal force magnitude), and capturing image data may be triggered by a press type corresponding to a full press (e.g., having a force magnitude that exceeds a predetermined threshold associated with a maximal force). In other words, rather than determining whether or not an operation is to be initiated based on whether or not a physical button press occurred, the techniques described herein may be used to identify an operation from a set of multiple potential operations (e.g., more than two, more than five, more than ten, etc.) based on an identified press type. As described above, the press type may in turn be identified based on continuous-valued sensor data across one or more dimensions. FIG. 1 illustrates an example configuration of a wrist-worn device that includes a force sensor disposed proximate to a side portion of an enclosure. FIGS. 2 and 3 illustrate graphs of example sensor data that depict various example combinations of force characteristics, which may be used to identify particular press types.

Figure 4:
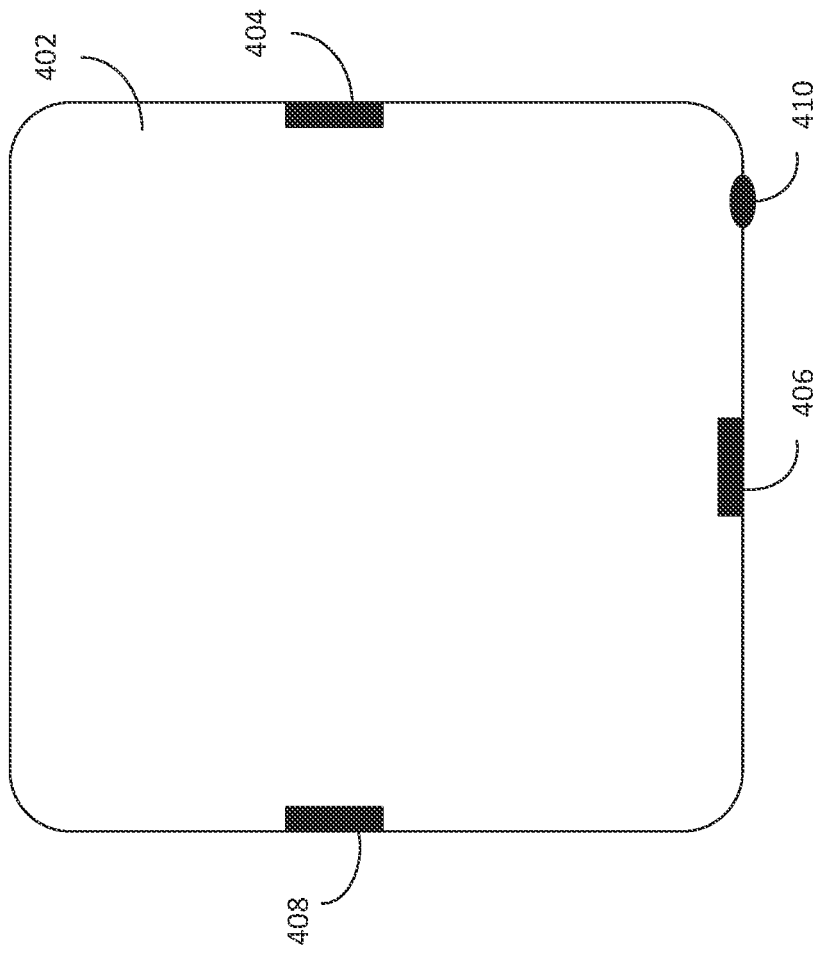
FIG. 4 is a schematic diagram of a top view of a wrist-worn device that includes multiple pressure sensors suitable for use in connection with user interactions according to certain embodiments.

In some implementations, a wrist-worn device may be associated with multiple force sensors. For example, each force sensor may be disposed along a different portion of an enclosure of a capsule of the wrist-worn device. Continuing with this example, sensor data from the multiple force sensors may be combined or aggregated to determine a press location (e.g., in x-y coordinates, or the like). In some embodiments, determined press locations may be utilized as user input. For example, a determined press location may be utilized as an x-y coordinate as a type of virtual joystick input. In some implementations, changes in press locations may be utilized as user input. For example, a direction of a change in press location (e.g., upward, downward, to the right, to the left, etc.) may be utilized in connection with a slider type control, e.g., to change volume of audio content or the like. FIG. 4 shows a schematic diagram of an example capsule of a wrist-worn device that includes multiple force sensors according to some embodiments.

FIG. 1 is a cross-sectional side view of a portion of an example wrist-worn device 100 that includes a force sensor suitable for utilizing pressure sensing in connection with user interactions according to some embodiments. Wrist-worn device 100 includes a capsule, a portion of which is shown in FIG. 1. The capsule may include (e.g., on the top portion) a touchscreen. The back portion of the capsule may include sensors, e.g., light-emitting diodes suitable for measuring physiological characteristics such as heart rate, blood oxygen saturation level, etc.

As illustrated, the capsule includes a side portion 102, which is part of an enclosure of the capsule. A force sensor 104 is operatively coupled to or adhered to an inner wall of side portion 102. For example, as shown in FIG. 1, force sensor 104 is affixed to the inner wall of side portion 102 via a circuit board 106 and a thermally isolating material 108. As a more particular example, force sensor 104 may be affixed to circuit board 106 (e.g., via soldering, and/or any other suitable method), and circuit board 106 may be affixed to thermally isolating material 108, which may in turn be affixed to the inner wall of side portion 102. It should be noted that, in some embodiments, thermally isolating material 108 may be omitted. Thermally isolating material 108 may serve to reduce the effect of temperature fluctuations at the outer wall of side portion 102 (which may be at least partially made of metal, and therefore, conduct heat well) on the output of force sensor 104. A force on the outer wall of side portion 102 may then register in sensor data produced by force sensor 104.

It should be noted that another example of a configuration for implementing a force sensor with respect to an enclosure of a capsule of a wrist-worn device is shown in and described below in connection with FIG. 6.

As described above, a press type from a set of candidate press types may be identified based on force characteristics, such as magnitude of the force of a press interaction, duration of the press interaction, change in force magnitude over time, or the like. FIG. 2 illustrates force characteristics for three different press types in accordance with some embodiments. Note that the graph shown in FIG. 2 illustrates force magnitude on the y-axis, and time on the x-axis. In the graph shown in FIG. 2, force characteristics 202 are associated with a press type of "soft tap." In particular, force characteristics 202 illustrate a relatively short duration press having relatively low magnitude that just exceeds the soft tap event threshold. Force characteristics 204 are associated with a press type of "strong click." In particular, force characteristics 204 illustrate a relatively short duration press having a magnitude that just exceeds the strong click event threshold. Note that the strong click event threshold is higher than the soft tap event threshold, and, accordingly, force characteristics 204 are mapped to the "strong click" press type rather than the "soft tap" press type. Force characteristics 206 are associated with a press type of "strong press and hold." In particular, force characteristics 206 illustrate a relatively longer duration (e.g., a "hold") having a magnitude that exceeds that of the strong press and hold threshold. Note that the strong press and hold event threshold is higher than the soft tap event threshold and the strong click event threshold. Note that force characteristics 206 may be mapped to the "strong press and hold" press type based on a combination of force magnitude (e.g., exceeding the strong press and hold event threshold) and press duration (e.g., exceeding a strong press and hold duration threshold, which is not shown in FIG. 2).

FIG. 3 illustrates force characteristics for four other press types in accordance with some embodiments. In particular, the graph shown in FIG. 3 illustrates the magnitude of the detected force (on the y-axis) as a function of time (on the x-axis) for the four press types. Force characteristics 302 and 304 are associated with high force free pressing and low force free pressing, respectively. As shown in FIG. 3, force characteristics 302 depict three high force presses, and force characteristics 304 depict six low force presses. Not that the force magnitude for each of the presses in force characteristics 304 is lower than the force magnitude for any of the three high force presses represented in force characteristics 302.

Force characteristics 306 illustrate a ramp press type in which the magnitude of the force changes over time. Note that although force characteristics 306 illustrate a force magnitude that increases over time, a ramp press type may have force characteristics corresponding to a decrease in force magnitude over time. In some cases, a set of press types may include an increasing ramp press type and a decreasing ramp press type. Additionally, although not shown in FIG. 3, the set of press types may include a press type having force characteristics corresponding to a step increase in force magnitude. As a more particular example, such a press type may have a hold period at a first force magnitude and then a sudden (e.g., step) increase or decrease in force magnitude to a second force magnitude.

Force characteristics 308 illustrate a press type of free press and hold. As illustrated, the force magnitude associated with this press type may not be associated with any threshold of force magnitude. In some embodiments, there may be a threshold hold duration associated with the free press and hold press type, such as 500 milliseconds, 750 milliseconds, 1000 milliseconds, or the like.

It should be noted that a set of press types may include press types not represented in FIGS. 2 and 3. Additionally, it should be understood that force characteristics shown in and described in connection with FIGS. 2 and/or 3 may be associated with a press type having a different name than that used in here.

In some implementations, an enclosure of a capsule of a wrist-worn device may include multiple sensors configured to measure forces associated with user presses on the capsule. In some embodiments, sensor data from two or more of the sensors may be combined or aggregated. For example, the sensor data may be combined to determine a press location with respect to the two or more sensors. As a more particular example, the press location may be determined based on differences in force magnitude measured at each of the two or more sensors. In some implementations, movement associated with a press (e.g., a press that slides over a portion of an enclosure of the capsule may be determined based on sensor data from two or more sensors. For example, a press movement from a first location to a second location may be determined. In some implementations, various other information associated with the press movement may be identified, such as a speed of the press movement.

In some implementations, a press location and/or press movement may be utilized in connection with various operations of the wrist-worn device. For example, a press location may be utilized as a user input, e.g., as a virtual joystick input. Such virtual joystick input may be utilized in connection with a video game application, a drawing application, etc. As another example, a press movement may be utilized as user input, e.g., as a slider input. Such slider input may be utilized in connection with a volume adjustment control, a scrolling control (e.g., to scroll through a menu or other set of options), etc.

FIG. 4 shows a top view of an example capsule 402 of a wrist-worn device that includes multiple sensors configured to measure force applied to the enclosure of capsule 402. In particular, capsule 402 includes sensors 404, 406, and 408. Each of sensors 404, 406, and 408 are disposed on an inner wall of a side portion of the enclosure of capsule 402. In some implementations, a location of a press on the side of the enclosure of capsule 402 may be determined based on sensor data from any combination of sensors 404, 406, and 408. For example, in an instance in which a wearer of the wrist-worn device presses the enclosure at location 410, location 410 may be identified based on a combination of sensor data from sensors 404, 406, and/or 408. As a more particular example, a comparison of the sensor data from sensors 404, 406, or 408 may indicate that the force magnitude registered by sensor 406 is the highest, and, accordingly, location 410 is likely to be closest to sensor 406. In some implementations, locations of presses may be identified using a look up table or a function that takes, as input, sensor data from two or more sensors and generates, as an output, a likely press location.

As described above, in some implementations, sensor data may be obtained from one or more sensors disposed proximate to an enclosure of a capsule of a wrist-worn device. For example, the one or more sensors may be disposed proximate to an inner wall of a side portion of the enclosure, as shown in and described above in connection with FIGS. 1 and 4. In some embodiments, based on the sensor data, a determination that a press interaction has occurred may be made. In some implementations, force characteristics associated with the press interaction may be determined based on the sensor data. For example, the force characteristics may include force magnitude, duration of the press, a change in force magnitude over time, or any combination thereof. In some implementations, a press type may be identified or selected from a set of press types. The set of press types may be a set of pre-defined press types, each press type being associated with a unique combination of force characteristics (e.g., a unique combination of force magnitude, press duration, and/or change in force magnitude over time). Based on the identified or selected press type, an operation of the wrist-worn device may be identified. In other words, the operation may be identified based at least in part on continuous-valued sensor data (e.g., force magnitude, press duration, and/or change in magnitude over time), thereby allowing press interactions analyzed in connection with sensor data from a single force sensor to be mapped to an operation from a set of multiple candidate operations. The operation may be associated with any suitable component of the wrist-worn device, such as a front camera, a rear camera, an actuator that couples a capsule to a cradle, a display screen, etc. In some implementations, the identified operation may then be performed by the wrist-worn device.

Figure 5:
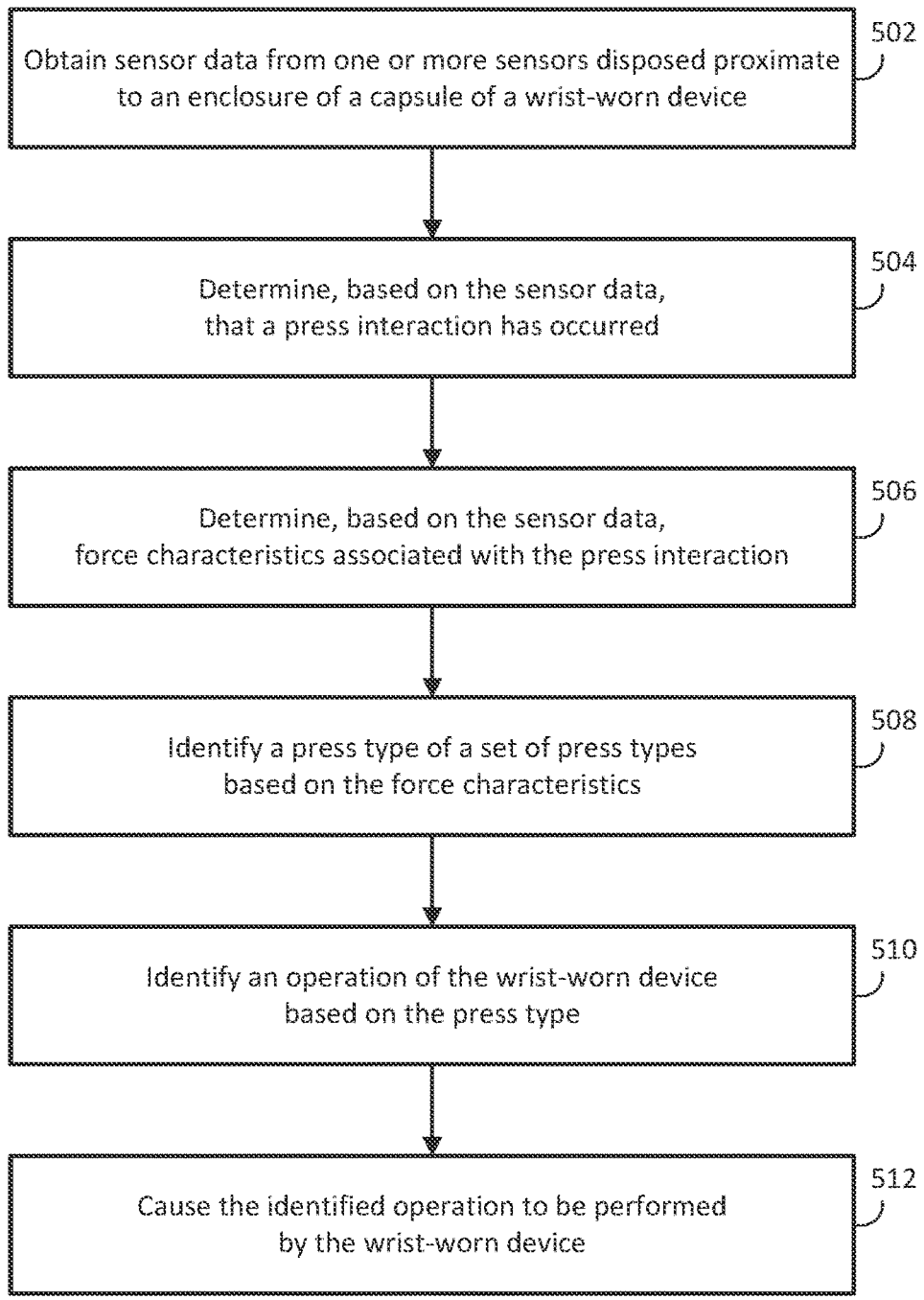
FIG. 5 is a flowchart of an example process for utilizing contact pressure measurements according to certain embodiments.

FIG. 5 illustrates an example process 500 for utilizing force characteristics of a press interaction to identify operations of a wrist-worn device according to certain embodiments. In some implementations, blocks of process 500 may be performed by a processor of the wrist-worn device. In some embodiments, blocks of process 500 may be performed in an order other than what is shown in FIG. 5. In some embodiments, two or more blocks of process 500 may be performed substantially in parallel. In some embodiments, one or more blocks of process 500 may be omitted.

Process 500 can begin at 502 by obtaining sensor data from one or more sensors disposed proximate to an enclosure of a capsule of the wrist-worn device. For example, the one or more sensors may be disposed proximate to an inner wall of a side portion of the enclosure, as shown in and described above in connection with FIGS. 1 and 4. A specific example of a configuration for disposing a force sensor proximate to an enclosure surface is shown in and described below in connection with FIG. 6, although it should be noted that this configuration is merely exemplary. Additionally, it should be noted that, in some implementations, a sensor of the one or more sensors may be configured to operate as a compression force sensor (e.g., that is configured to output data indicative of a compression force being applied to the force sensor positioned between two surfaces) or a strain gauge type force sensor (e.g., that is configured to output data indicative of a bending or strain force being applied to a surface on which the sensor is disposed). In some implementations, the sensor data may be obtained via an analogto-digital converter (ADC) that receives analog sensor output(s) and generates digital data representative of the sensor output.

At 504, process 500 can determine, based on the sensor data, that a press interaction has occurred. In some implementations, process 500 can determine that a press interaction has occurred responsive to determining that data output by the sensor indicative of force magnitude has exceeded a press threshold. In some implementations, process 500 may determine that a press interaction has occurred responsive to determining that the data indicative of force magnitude has exceeded a press threshold for more than a threshold duration of time, which may prevent noisy sensor data from registering as press interactions.

At 506, process 500 can determine, based on the sensor data, force characteristics associated with the press interaction. As described above, the force characteristics may include a force magnitude associated with the press interaction, a duration of the press interaction, and/or a change in the force magnitude as a function of time. In some implementations, process 500 may determine the force characteristics by identifying a portion of sensor data corresponding to a window of time that substantially corresponds to the time at which the press interaction was identified. For example, in some implementations, the window of time may include a pre-determined duration of time prior to detection of the press interaction (e.g., 100 milliseconds, 200 milliseconds, etc.) to a pre-determined duration of time after detection of the press interaction (e.g., 500 milliseconds, 750 milliseconds, 1000 milliseconds, 2000 milliseconds, or the like).

In some implementations, the force characteristics may additionally include a likely press location. For example, in instances in which there are two or more sensors disposed proximate to the enclosure (e.g., as shown in FIG. 4), the likely press location may be determined based on sensor data from the two or more sensors (or, in an instance in which there are three or more sensors, based on a subset of the three or more sensors). In some implementations, the force characteristics may additionally include information associated with a press movement, such as a direction of the press movement (e.g., to the right, to the left, up, down, etc.) and/or a speed of the press movement.

At 508, process 500 can identify, or select, a press type from a set of press types based on the force characteristics. In some implementations, the set of press types may be a set of pre-defined press types. The set of press types may include any suitable number of pre-defined press types, such as 3 press types, 5 press types, 10 press types, etc. Example press types that differ primarily based on force magnitude may include a soft tap and a strong click, as shown in and described above in connection with FIG. 2. Example press types that differ primarily in press duration include a high force free press and a strong press and hold. Other examples of press types include an increasing ramp press, a decreasing ramp press, a step-wise increasing press, a step-wise decreasing press, etc. Examples of press types and corresponding force characteristics are shown in and described above in connection with FIGS. 2 and 3.

At 510, process 500 can identify an operation of the wrist-worn device based on the press type. For example, the operation may be identified from a set of operations, which may be a set of pre-defined operations. In some implementations, an operation may be associated with a particular component of the wrist-worn device, such as a front camera, a rear camera, an actuator that couples the capsule to a cradle of the wrist-worn device, a display screen of the wrist-worn device, etc. Example operations include: operations associated with a front or rear camera (e.g., opening an application associated with the front or rear camera, causing an auto-focus procedure to be performed with the front or rear camera, causing still image data to be captured using the front or rear camera, causing video data to be captured using the front or rear camera, etc.); causing the capsule to detach from the cradle; causing a menu element or icon to be selected; causing a home screen or display to be presented; and causing various modes to be toggled on or off (e.g., a waterproof mode, a silent mode, a night mode, a flashlight, a do not disturb mode, a haptic feedback mode, etc.).

In some implementations, the operation may be identified by providing the identified press type to an operation or look up table that maps press types of the set of press types to particular operations. In some implementations, identification of the operation may depend on whether or not the capsule is coupled to the cradle. For example, in some embodiments, a given press type (e.g., a strong press and hold, a soft tap, etc.) may be associated with a first operation (e.g., opening a front camera application) when the capsule is coupled to the cradle, and the same press type may be associated with a second operation different from the first operation (e.g., opening a rear camera application) when the capsule is not coupled to the cradle.

In some implementations, a variation in a single dimension of force characteristics may map to different operations. In one example, a camera auto-focus operation may be performed responsive to determining that a soft press and hold press interaction has occurred, and an obtain camera data operation may be performed responsive to determining a high force press and hold press interaction has occurred. In this example, a variation in force magnitude (e.g., soft versus high force) may be used to select between the auto-focus operation and the obtain camera data operation. In another example, a show home screen operation may be performed responsive to determining that a high force tap press interaction has occurred, and a detach capsule from cradle operation may be performed responsive to determining that a high force press and hold press interaction has occurred. In this example, a variation in press duration may be used to select between the show home screen operation and the detach capsule operation.

At 512, process 500 may cause the identified operation to be performed by the wrist-worn device. In some implementations, process 500 may cause the identified operation to be performed using any application executing on the wrist-worn device, such as a camera application, a graphic user interface application, or the like.

It should be noted that in instances in which press location or press movement characteristics are determined based on sensor data from two or more sensors, the operation may be performed utilizing the press location or press movement characteristics. For example, in an instance in which the press interaction is being utilized as virtual joystick control, the press location and/or press movement characteristics may be utilized, e.g., in connection with a video game or other interactive application. As another example, in an instance in which the press interaction is being utilized as a user input to control a slider type input, press movement characteristics, such as a direction of the press movement and/or a speed of the press movement may be utilized in connection with the slider input. As a more particular example, relatively faster press movements may be used to scroll through a list of options at a relatively faster pace, adjust a volume of audio content at a relatively faster pace, or the like relative to slower press movements.

In some implementations, a force sensor may be disposed proximate to an inner wall of the enclosure via a circuit board. For example, the force sensor may be soldered to the circuit board, and sensor data may be read via the circuit board. In some embodiments, the circuit board may be affixed to the inner wall via a thermally isolating material. The thermally isolating material may serve to absorb heat from a finger (e.g., of the wearer of the wrist-worn device) when pressing on the opposing (e.g., outer) wall of the enclosure. In particular, because the wall of the enclosure may be at least partially made of metal, the wall of the enclosure may conduct heat from the outer wall to the inner wall, which may effect sensor data from the force sensor. Accordingly, the thermally isolating material may serve to absorb heat. Moreover, the thermally isolating material may serve to position the force sensor at a fixed initial position (e.g., an initial position corresponding to no press on the outer wall of the enclosure), whereas the position of the force sensor may be floating in the absence of the thermally isolating material. By absorbing heat and fixing an initial position of the force sensor, the thermally isolating material may effectively reduce noise in the sensor data generated by the force sensor. The thermally isolating material may include rubber, silicon, foam, or the like.

In some implementations, one side of the force sensor may be coupled to a circuit board, and the opposing side may be attached to a linear resonator actuator (LRA). The LRA may be configured to provide haptic feedback to a wearer of the wrist-worn device. In some implementations, the haptic feedback may include vibration, pulses, sustained vibration with varying intensity, etc. In some embodiments, a type of haptic feedback provided by the LRA may depend on a press type identified in connection with a press interaction and/or based on an operation identified based on the press type. For example, in some implementations, haptic feedback corresponding to a long vibration may be used for a first press type, and haptic feedback corresponding to a series of short pulses may be used for a second press type. It should be noted that by disposing the force sensor between two surfaces (i.e., the circuit board and the LRA), the force sensor may be configured to operate as a compression force sensor.

Figure 6:
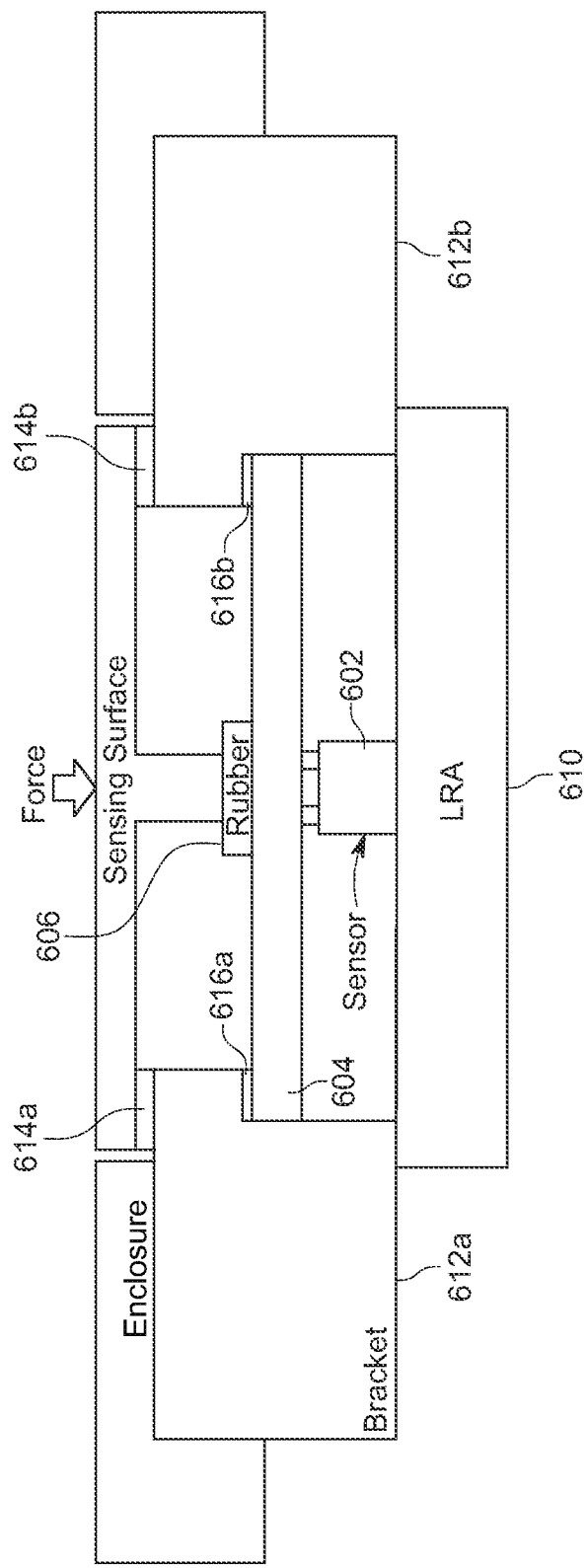
FIG. 6 is a schematic diagram that illustrates one example implementation of a contact pressure sensor according to certain embodiments.

FIG. 6 illustrates an example configuration that utilizes a thermally isolating material and an LRA in accordance with some embodiments. As illustrated, a first side of a force sensor 602 is affixed to a first side of a circuit board 604. The opposing side of circuit board 604 is attached to a thermally isolating material 606, which is in turn affixed to an inner wall portion of a sensing surface 608. Sensing surface 608 may be a portion of the enclosure of a capsule of a wrist-worn device. The opposing side of force sensor 602 is affixed to a first side of an LRA 610. LRA 610 is configured to provide haptic feedback to a wearer of the wrist-worn device. As illustrated, brackets 612a and 612b are utilized to couple LRA 610, circuit board 604, and sensing surface 608. In particular, adhesive portions 614a and 614b are used to attach brackets 612a and 612b to sensing surface 608, respectively. Adhesive portions 616a and 616b are used to attach brackets 612a and 612b to circuit board 604. LRA 610 is joined to the assembly due to being affixed to force sensor 602, which is in turn affixed to circuit board 604.

Figure 7:
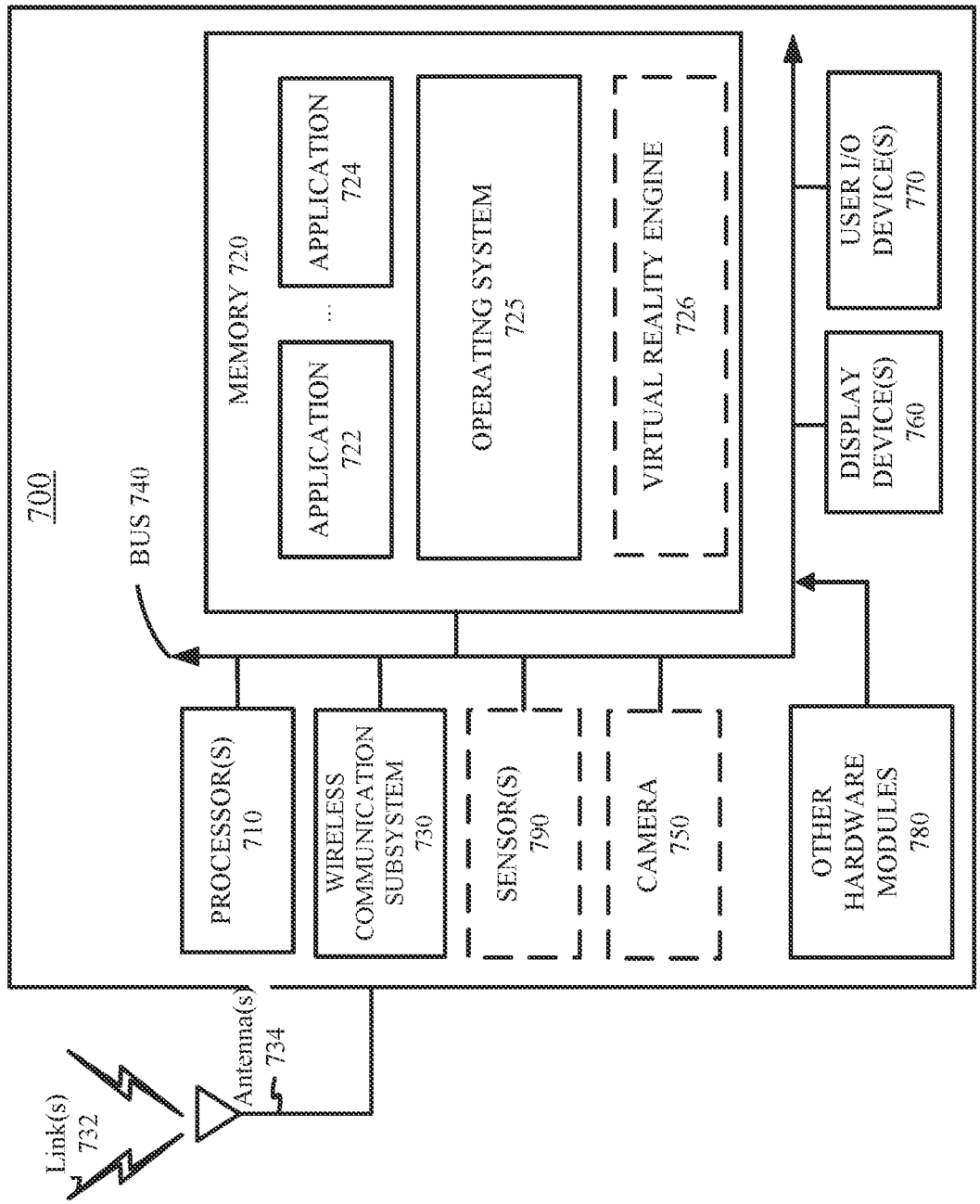
FIG. 7 is a simplified block diagram of an example of a computing system that may be implemented as part of a mobile device and/or a user device according to certain embodiments.

FIG. 7 is a simplified block diagram of an example of a computing system 700 for implementing some of the examples described herein. For example, in some embodiments, computing system may be used to implement a user device (e.g., a mobile phone, a tablet computer, a wrist-worn device, etc.) that implements the blocks of process 300 and/or process 400 shown in and described above in connection with FIGS. 3 and 4. In the illustrated example, computing system 700 may include one or more processor (s) 710 and a memory 720. Processor(s) 710 may be configured to execute instructions for performing operations at a number of components, and can be, for example, a general-purpose processor or microprocessor suitable for implementation within a portable electronic device. Processor(s) 710 may be communicatively coupled with a plurality of components within computing system 700. To realize this communicative coupling, processor(s) 710 may communicate with the other illustrated components across a bus 740. Bus 740 may be any subsystem adapted to transfer data within computing system 700. Bus 740 may include a plurality of computer buses and additional circuitry to transfer data.

Memory 720 may be coupled to processor(s) 710. In some embodiments, memory 720 may offer both short-term and long-term storage and may be divided into several units. Memory 720 may be volatile, such as static random access memory (SRAM) and/or dynamic random access memory (DRAM) and/or non-volatile, such as read-only memory (ROM), flash memory, and the like. Furthermore, memory 720 may include removable storage devices, such as secure digital (SD) cards. Memory 720 may provide storage of computer-readable instructions, data structures, program modules, and other data for computing system 700. In some embodiments, memory 720 may be distributed into different hardware modules. A set of instructions and/or code might be stored on memory 720. The instructions might take the form of executable code that may be executable by computing system 700, and/or might take the form of source and/or installable code, which, upon compilation and/or installation on computing system 700 (e.g., using any of a variety of generally available compilers, installation programs, compression/decompression utilities, etc.), may take the form of executable code.

In some embodiments, memory 720 may store a plurality of application modules 722 through 724, which may include any number of applications. Examples of applications may include gaming applications, conferencing applications, video playback applications, or other suitable applications. The applications may include a depth sensing function or eye tracking function. Application modules 722-724 may include particular instructions to be executed by processor(s) 710. In some embodiments, certain applications or parts of application modules 722-724 may be executable by other hardware modules 780. In certain embodiments, memory 720 may additionally include secure memory, which may include additional security controls to prevent copying or other unauthorized access to secure information.

In some embodiments, memory 720 may include an operating system 725 loaded therein. Operating system 725 may be operable to initiate the execution of the instructions provided by application modules 722-724 and/or manage other hardware modules 780 as well as interfaces with a wireless communication subsystem 730 which may include one or more wireless transceivers. Operating system 725 may be adapted to perform other operations across the components of computing system 700 including threading, resource management, data storage control and other similar functionality.

Wireless communication subsystem 730 may include, for example, an infrared communication device, a wireless communication device and/or chipset (such as a Bluetooth® device, an IEEE 802.11 device, a Wi-Fi device, a WiMax device, cellular communication facilities, etc.), and/or similar communication interfaces. Computing system 700 may include one or more antennas 734 for wireless communication as part of wireless communication subsystem 730 or as a separate component coupled to any portion of the system. Depending on desired functionality, wireless communication subsystem 730 may include separate transceivers to communicate with base transceiver stations and other wireless devices and access points, which may include communicating with different data networks and/or network types, such as wireless wide-area networks (WWANs), wireless local area networks (WLANs), or wireless personal area networks (WPANs). A WWAN may be, for example, a WiMax (IEEE 802.17) network. A WLAN may be, for example, an IEEE 802.11x network. A WPAN may be, for example, a Bluetooth network, an IEEE 802.7x, or some other types of network. The techniques described herein may also be used for any combination of WWAN, WLAN, and/or WPAN. Wireless communications subsystem 730 may permit data to be exchanged with a network, other computer systems, and/or any other devices described herein. Wireless communication subsystem 730 may include a means for transmitting or receiving data, such as identifiers of HMD devices, position data, a geographic map, a heat map, photos, or videos, using antenna(s) 734 and wireless link(s) 732. Wireless communication subsystem 730, processor(s) 710, and memory 720 may together comprise at least a part of one or more of a means for performing some functions disclosed herein.

Embodiments of computing system 700 may also include one or more sensors 790. Sensor(s) 790 may include, for example, an image sensor, an accelerometer, a pressure sensor, a temperature sensor, a proximity sensor, a magnetometer, a gyroscope, an inertial sensor (e.g., a module that combines an accelerometer and a gyroscope), an ambient light sensor, or any other similar module operable to provide sensory output and/or receive sensory input, such as a depth sensor or a position sensor. For example, in some implementations, sensor(s) 790 may include one or more inertial measurement units (IMUs) and/or one or more position sensors. An IMU may generate calibration data indicating an estimated position of a device, based on measurement signals received from one or more of the position sensors. A position sensor may generate one or more measurement signals in response to motion of a device. Examples of the position sensors may include, but are not limited to, one or more accelerometers, one or more gyroscopes, one or more magnetometers, another suitable type of sensor that detects motion, a type of sensor used for error correction of the IMU, or some combination thereof. The position sensors may be located external to the IMU, internal to the IMU, or some combination thereof. At least some sensors may use a structured light pattern for sensing.

Computing system 700 may include a display module 760. Display module 760 may be a near-eye display, and may graphically present information, such as images, videos, and various instructions, from computing system 700 to a user. Such information may be derived from one or more application modules 722-724, virtual reality engine 726, one or more other hardware modules 780, a combination thereof, or any other suitable means for resolving graphical content for the user (e.g., by operating system 725). Display module 760 may use liquid crystal display (LCD) technology, light-emitting diode (LED) technology (including, for example, OLED, ILED, μLED, AMOLED, TOLED, etc.), light emitting polymer display (LPD) technology, or some other display technology.

Computing system 700 may include a user input/output module 770. User input/output module 770 may allow a user to send action requests to computing system 700. An action request may be a request to perform a particular action. For example, an action request may be to start or end an application or to perform a particular action within the application. User input/output module 770 may include one or more input devices. Example input devices may include a touchscreen, a touch pad, microphone(s), button(s), dial(s), switch(es), a keyboard, a mouse, a game controller, or any other suitable device for receiving action requests and communicating the received action requests to computing system 700. In some embodiments, user input/output module 770 may provide haptic feedback to the user in accordance with instructions received from computing system 700. For example, the haptic feedback may be provided when an action request is received or has been performed.

Computing system 700 may include a camera 750 that may be used to take photos or videos. Camera 750 may be configured to take photos or videos of the user. Camera 750 may also be used to take photos or videos of the environment, for example, for VR, AR, or MR applications. Camera 750 may include, for example, a complementary metal-oxide-semiconductor (CMOS) image sensor with a few millions or tens of millions of pixels. In some implementations, camera 750 may include two or more cameras that may be used to capture 3-D images.

In some embodiments, computing system 700 may include a plurality of other hardware modules 780. Each of other hardware modules 780 may be a physical module within computing system 700. While each of other hardware modules 780 may be permanently configured as a structure, some of other hardware modules 780 may be temporarily configured to perform specific functions or temporarily activated. Examples of other hardware modules 780 may include, for example, an audio output and/or input module (e.g., a microphone or speaker), a near field communication (NFC) module, a rechargeable battery, a battery management system, a wired/wireless battery charging system, etc. In some embodiments, one or more functions of other hardware modules 780 may be implemented in software.

In some embodiments, memory 720 of computing system 700 may also store a virtual reality engine 726. Virtual reality engine 726 may execute applications within computing system 800 and receive position information, acceleration information, velocity information, predicted future positions, or some combination thereof from the various sensors. In some embodiments, the information received by virtual reality engine 726 may be used for producing a signal (e.g., display instructions) to display module 760. For example, if the received information indicates that the user has looked to the left, virtual reality engine 726 may generate content that mirrors the user's movement in a virtual environment. Additionally, virtual reality engine 726 may perform an action within an application in response to an action request received from user input/output module 770 and provide feedback to the user. The provided feedback may be visual, audible, or haptic feedback. In some implementations, processor(s) 710 may include one or more GPUs that may execute virtual reality engine 726.

In various implementations, the above-described hardware and modules may be implemented on a single device or on multiple devices that can communicate with one another using wired or wireless connections. For example, in some implementations, some components or modules, such as GPUs, virtual reality engine 726, and applications (e.g., tracking application), may be implemented on two or more paired or connected devices.

In alternative configurations, different and/or additional components may be included in computing system 700. Similarly, functionality of one or more of the components can be distributed among the components in a manner different from the manner described above. For example, in some embodiments, computing system 700 may be modified to include other system environments, such as an AR system environment and/or an MR environment.

Figure 8:
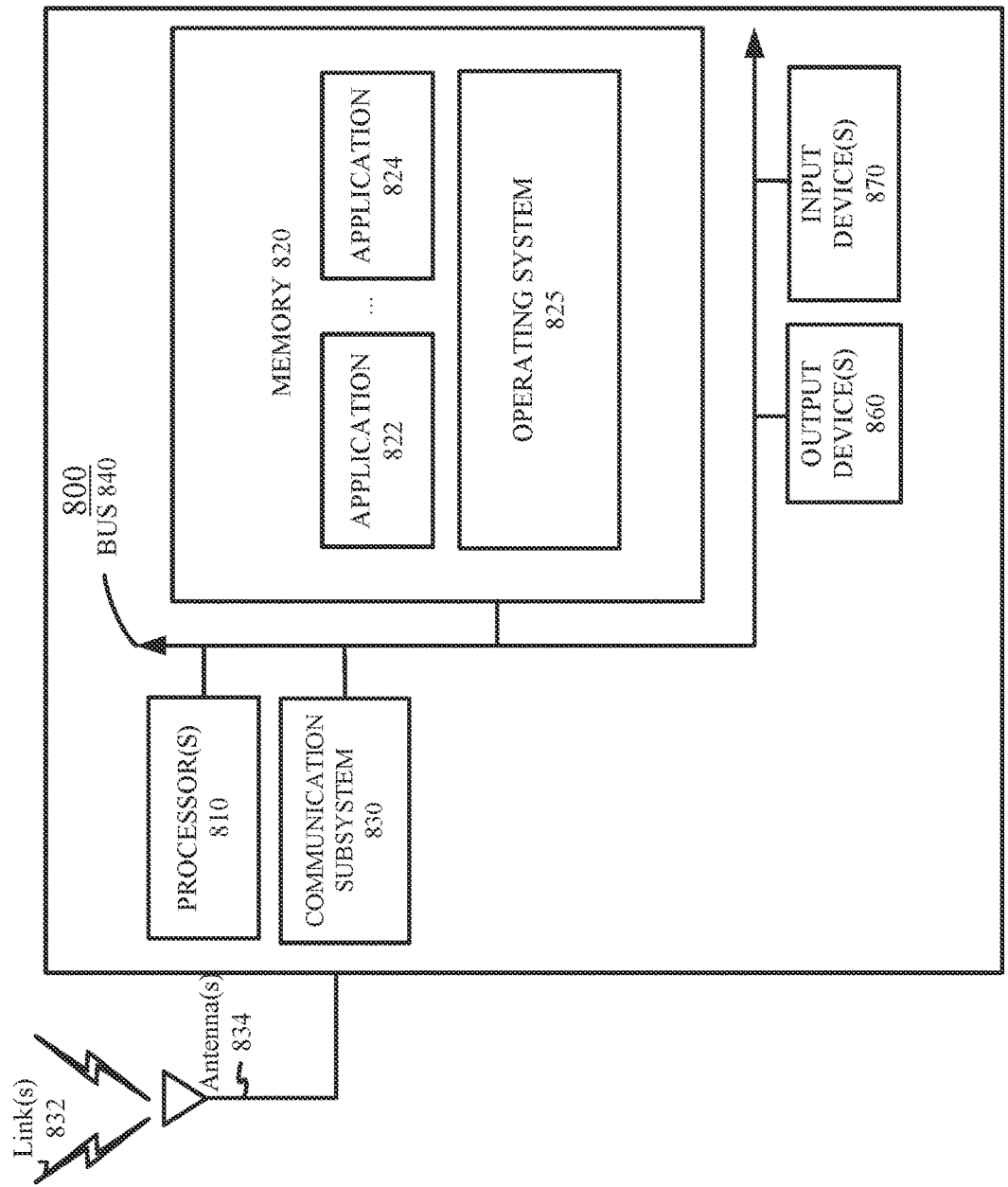
FIG. 8 is a simplified block diagram of an example of a computing system that may be implemented as part of a server according to certain embodiments.

FIG. 8 is a simplified block diagram of an example of a computing system 800 that may be implemented in connection with a server in accordance with some embodiments. For example, computing system 800 may be used to implement a server that stores or generates mappings between force characteristics and press types, stores or generates mappings between press types and functions of a wrist-worn device, or the like.

In the illustrated example, computing system 800 may include one or more processor(s) 810 and a memory 820. Processor(s) 810 may be configured to execute instructions for performing operations at a number of components, and can be, for example, a general-purpose processor or microprocessor suitable for implementation within a portable electronic device. Processor(s) 810 may be communicatively coupled with a plurality of components within computing system 800. To realize this communicative coupling, processor(s) 810 may communicate with the other illustrated components across a bus 840. Bus 840 may be any subsystem adapted to transfer data within computing system 800. Bus 840 may include a plurality of computer buses and additional circuitry to transfer data. In some embodiments, processor(s) 810 may be configured to perform one or more blocks of process 400, as shown in and described above in connection with FIG. 4, respectively.

Memory 820 may be coupled to processor(s) 810. In some embodiments, memory 820 may offer both short-term and long-term storage and may be divided into several units. Memory 820 may be volatile, such as static random access memory (SRAM) and/or dynamic random access memory (DRAM) and/or non-volatile, such as read-only memory (ROM), flash memory, and the like. Furthermore, memory 820 may include removable storage devices, such as secure digital (SD) cards. Memory 820 may provide storage of computer-readable instructions, data structures, program modules, and other data for computing system 800. In some embodiments, memory 820 may be distributed into different hardware modules. A set of instructions and/or code might be stored on memory 820. The instructions might take the form of executable code that may be executable by computing system 800, and/or might take the form of source and/or installable code, which, upon compilation and/or installation on computing system 800 (e.g., using any of a variety of generally available compilers, installation programs, compression/decompression utilities, etc.), may take the form of executable code.

In some embodiments, memory 820 may store a plurality of application modules 822 through 824, which may include any number of applications. Examples of applications may include gaming applications, conferencing applications, video playback applications, or other suitable applications. Application modules 822-824 may include particular instructions to be executed by processor(s) 810. In some embodiments, certain applications or parts of application modules 822-824 may be executable by other hardware modules. In certain embodiments, memory 820 may additionally include secure memory, which may include additional security controls to prevent copying or other unauthorized access to secure information.

In some embodiments, memory 820 may include an operating system 825 loaded therein. Operating system 825 may be operable to initiate the execution of the instructions provided by application modules 822-824 and/or manage other hardware modules as well as interfaces with a wireless communication subsystem 830 which may include one or more wireless transceivers. Operating system 825 may be adapted to perform other operations across the components of computing system 800 including threading, resource management, data storage control and other similar functionality.

Communication subsystem 830 may include, for example, an infrared communication device, a wireless communication device and/or chipset (such as a Bluetooth® device, an IEEE 802.11 device, a Wi-Fi device, a WiMax device, cellular communication facilities, etc.), a wired communication interface, and/or similar communication interfaces. Computing system 800 may include one or more antennas 834 for wireless communication as part of wireless communication subsystem 830 or as a separate component coupled to any portion of the system. Depending on desired functionality, communication subsystem 830 may include separate transceivers to communicate with base transceiver stations and other wireless devices and access points, which may include communicating with different data networks and/or network types, such as wireless wide-area networks (WWANs), wireless local area networks (WLANs), or wireless personal area networks (WPANs). A WWAN may be, for example, a WiMax (IEEE 802.17) network. A WLAN may be, for example, an IEEE 802.11x network. A WPAN may be, for example, a Bluetooth network, an IEEE 802.8x, or some other types of network. The techniques described herein may also be used for any combination of WWAN, WLAN, and/or WPAN. Communications subsystem 830 may permit data to be exchanged with a network, other computer systems, and/or any other devices described herein. Communication subsystem 830 may include a means for transmitting or receiving data, using antenna(s) 834, wireless link(s) 832, or a wired link. Communication subsystem 830, processor(s) 810, and memory 820 may together comprise at least a part of one or more of a means for performing some functions disclosed herein.

In some embodiments, computing system 800 may include one or more output device(s) 860 and/or one or more input device(s) 870. Output device(s) 870 and/or input device(s) 870 may be used to provide output information and/or receive input information.

Embodiments disclosed herein may be used to implement components of an artificial reality system or may be implemented in conjunction with an artificial reality system. Artificial reality is a form of reality that has been adjusted in some manner before presentation to a user, which may include, for example, a virtual reality, an augmented reality, a mixed reality, a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, for example, create content in an artificial reality and/or are otherwise used in (e.g., perform activities in) an artificial reality. The artificial reality system that provides the artificial reality content may be implemented on various platforms, including an HMD connected to a host computer system, a standalone HMD, a mobile device or computing system, or any other hardware platform capable of providing artificial reality content to one or more viewers.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

Specific details are given in the description to provide a thorough understanding of the embodiments. However, embodiments may be practiced without these specific details. For example, well-known circuits, processes, systems, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing various embodiments. Various changes may be made in the function and arrangement of elements without departing from the spirit and scope of the present disclosure.

Also, some embodiments were described as processes depicted as flow diagrams or block diagrams. Although each may describe the operations as a sequential process, many of the operations may be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

It will be apparent to those skilled in the art that substantial variations may be made in accordance with specific requirements. For example, customized or special-purpose hardware might also be used, and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" may refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including, but not limited to, non-volatile media, volatile media, and transmission media. Common forms of computer-readable media include, for example, magnetic and/or optical media such as compact disk (CD) or digital versatile disk (DVD), punch cards, paper tape, any other physical medium with patterns of holes, a RAM, a programmable read-only memory (PROM), an erasable programmable read-only memory (EPROM), a FLASH-EPROM, any other memory chip or cartridge, a carrier wave as described hereinafter, or any other medium from which a computer can read instructions and/or code. A computer program product may include code and/or machine-executable instructions that may represent a procedure, a function, a subprogram, a program, a routine, an application (App), a subroutine, a module, a software package, a class, or any combination of instructions, data structures, or program statements.

Those of skill in the art will appreciate that information and signals used to communicate the messages described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Terms, "and" and "or" as used herein, may include a variety of meanings that are also expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AC, BC, AA, ABC, AAB, AABBCCC, etc.

Further, while certain embodiments have been described using a particular combination of hardware and software, it should be recognized that other combinations of hardware and software are also possible. Certain embodiments may be implemented only in hardware, or only in software, or using combinations thereof. In one example, software may be implemented with a computer program product containing computer program code or instructions executable by one or more processors for performing any or all of the steps, operations, or processes described in this disclosure, where the computer program may be stored on a non-transitory computer readable medium. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques, including, but not limited to, conventional techniques for inter-process communications, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. A wrist-worn device, comprising:
a capsule, comprising a top portion, a bottom portion, and a side portion joining the top portion and the bottom portion, wherein the side portion comprises an external side and an internal side;
a sensor, the sensor having a first side and a second side, the first side coupled to a circuit board, wherein the circuit board is affixed to a portion of the internal side of the side portion of the capsule via a thermally isolating material, the sensor configured to generate sensor data indicative of a force applied to a corresponding portion of the external side of the side portion of the capsule; and
a linear resonator actuator (LRA) configured to provide haptic feedback to a wearer of the wrist-worn device, the LRA affixed to the second side of the sensor.

2. The wrist-worn device of claim 1, wherein the sensor is configured to detect a compression force resulting from the force applied to the corresponding portion of the external side of the side portion of the capsule.

3. The wrist-worn device of claim 1, wherein the thermally isolating material comprises rubber, foam, or a silicon-containing material.

4. The wrist-worn device of claim 1, further comprising a bracket affixed to the circuit board and the internal side of the side portion of the capsule.

5. The wrist-worn device of claim 1, further comprising a controller configured to cause at least one operation to be performed based on data obtained from the sensor.

6. The wrist-worn device of claim 5, wherein the controller is configured to identify a press type of a plurality of press types based on force characteristics associated with the sensor data.

7. The wrist-worn device of claim 6, wherein the force characteristics comprise a magnitude of a force of a press associated with the force characteristics and a duration of the press associated with the force characteristics.

8. The wrist-worn device of claim 5, wherein the at least one operation comprises: one or more operations associated with a camera of the wrist-worn device, causing a home display to be presented, selecting a menu element displayed on a display of the wrist-worn device, detaching the capsule from a cradle of the wrist-worn device, or any combination thereof.

9. The wrist-worn device of claim 8, wherein the one or more operations associated with the camera of the wrist-worn device comprise: capturing camera data from a front camera of the wrist-worn device, capturing camera data from a rear camera of the wrist-worn device, performing an auto-focus operation of the front camera or the rear camera, or any combination thereof.

* * * * *